March 21, 1933. F. S. DUESENBERG 1,902,787
DAMPING DEVICE FOR CRANK SHAFTS
Filed Jan. 28, 1929 2 Sheets-Sheet 1
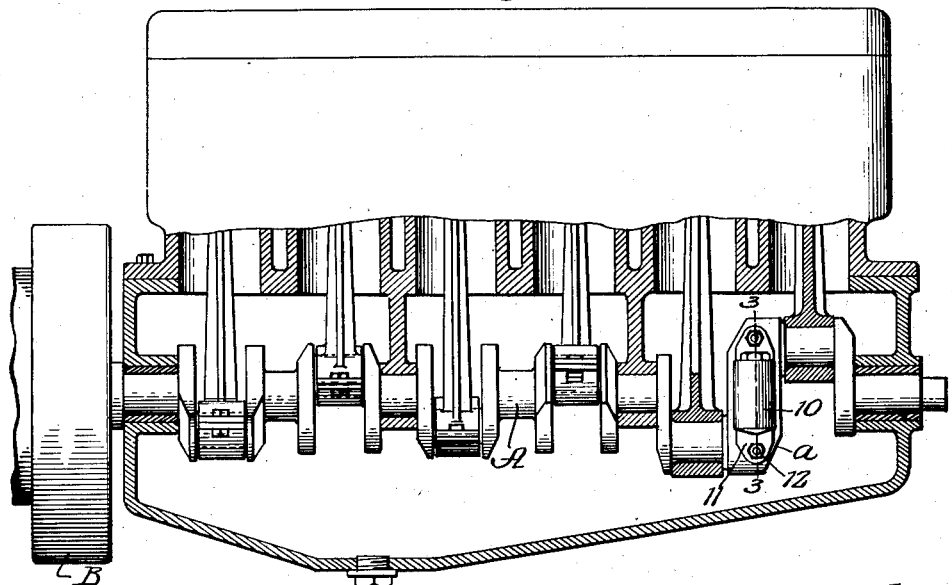
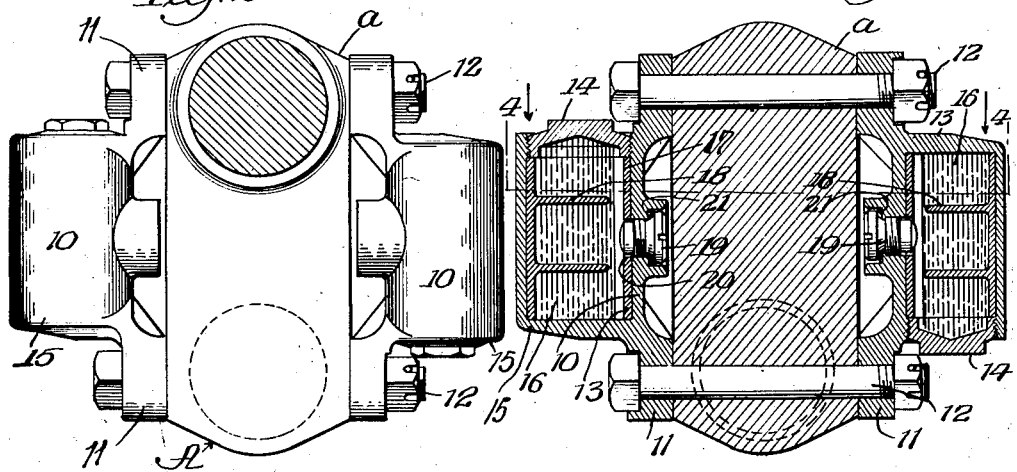
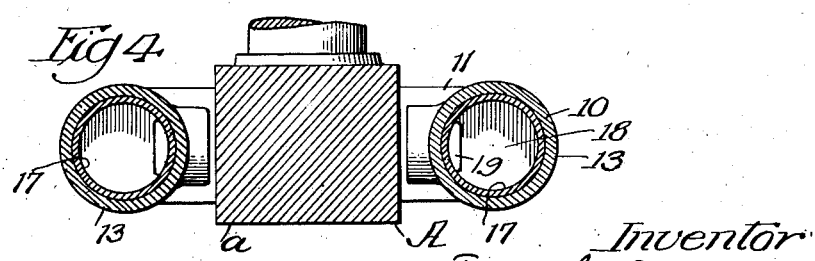
Inventor
Frederick S. Duesenberg
By Fred Gerlach
his Atty.

March 21, 1933.  F. S. DUESENBERG  1,902,787
DAMPING DEVICE FOR CRANK SHAFTS
Filed Jan. 28, 1929   2 Sheets-Sheet 2
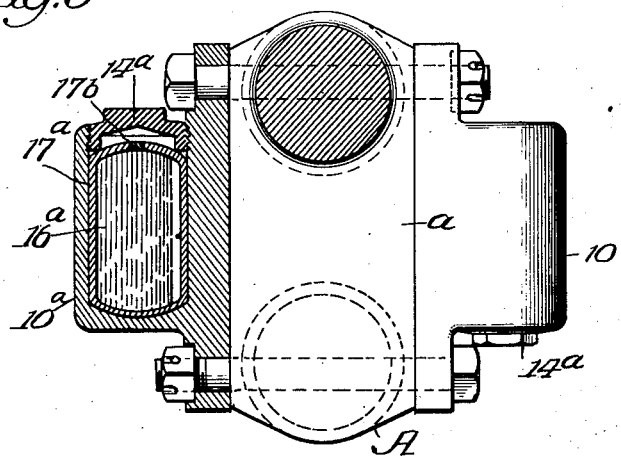
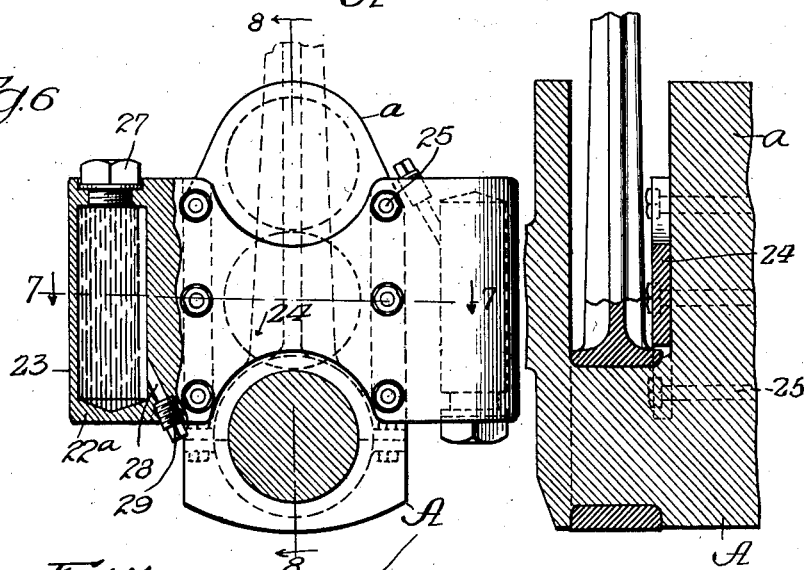
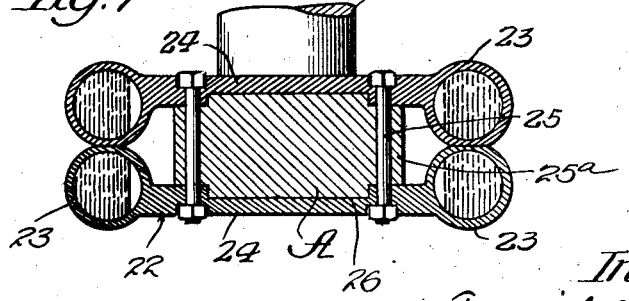
Inventor
Frederick S. Duesenberg
By Fred Gerlach
his Atty.

Patented Mar. 21, 1933

1,902,787

UNITED STATES PATENT OFFICE

FREDERICK S. DUESENBERG, OF INDIANAPOLIS, INDIANA, ASSIGNOR TO DUESENBERG, INC., OF INDIANAPOLIS, INDIANA, A CORPORATION OF DELAWARE

DAMPING DEVICE FOR CRANK-SHAFTS

Application filed January 28, 1929. Serial No. 335,405.

The present invention relates generally to devices for damping torsional vibrations in the crank-shafts of high speed multi-cylinder internal combustion engines. More particularly the invention relates to that type of vibration damping device which embodies a chamber containing mercury or a similar liquid and operates, during rotation of the crank-shaft, to damp the torsional vibrations by virtue of the fact that the mercury develops sufficient momentum and centrifugal force to act as a yielding medium.

One object of the invention is to provide a vibration damping device of the aforementioned type in which the mercury is confined to rotate positively with the crank-shaft so that the damping effect is of maximum magnitude.

Another object of the invention is to provide a vibration damping device of the type under consideration in which the mercury is confined in a pair of cylinders which are positioned in rotative succession with respect to the crank-shaft and are attached to opposite sides of one of the cranks.

Another object of the invention is the provision of shells which serve as containers for the mercury and are mounted in the cylinders so that they may be readily removed or inserted into place.

A further object of the invention is the provision of baffles which divide the mercury into portions in the cylinders, extend transversely across the path of rotation and operate to assist in confining the mercury so that it rotates positively with the crank-shaft.

A still further object of the invention is to provide a vibration damping device which may be readily applied to a crank-shaft without change in the construction thereof, is generally of new and improved construction and may be manufactured at a comparatively low cost.

Other objects of the invention and the various advantages and characteristics of the present construction will be apparent from a consideration of the following detailed description.

The invention consists in the several novel features hereinafter set forth and more particularly defined by the claims at the conclusion hereof.

In the drawings which accompany and form a part of this specification or disclosure and in which like numerals of reference denote corresponding parts throughout the several views:

Figure 1 is a vertical longitudinal sectional view of a high speed multi-cylinder internal combustion engine in which the crank-shaft thereof is provided with a torsional vibration damping device embodying the invention;

Figure 2 is a side elevational view of the crank with which the device is associated;

Figure 3 is a vertical section taken on the line 3—3 of Figure 1 and exhibiting in detail the manner in which the cylinders are mounted on the sides of the crank;

Figure 4 is a transverse section taken on the line 4—4 of Figure 3;

Figure 5 is a view, partly in elevation and partly in vertical section, exhibiting a vibration damping device embodying a second form of the invention;

Figure 6 is a view, partly in elevation and partly in vertical section, of a damping device embodying a third form of the invention;

Figure 7 is a horizontal section taken on the line 7—7 of Figure 6; and

Figure 8 is a vertical section taken on the line 8—8 of Figure 6.

The invention is exemplified with the crank-shaft A of a multi-cylinder high speed engine, to one end of which a fly-wheel B is secured. The damping devices are secured to one of the cranks $a$ which is remotely located from the fly-wheel. These devices are similar in construction, and are secured to the opposite sides of the crank to balance each other. Each of these devices comprises a casing 10 which is provided with perforated lugs 11 to fit against one side of the crank, and bolts 12 pass through these lugs and are adapted to securely clamp the casings against the sides of the crank respectively. Each casing is formed with a cylindrical chamber 13, extending lengthwise of the crank. One end of this chamber is closed by an integral wall 15 and the other end by a cap or head 14 which is screw-threaded into the casing, so it can be removed. Each chamber 13 is adapted to contain a body or column 16 of liquid, preferably of a high specific gravity, such as mercury, which will be rotated around the axis of, and with, the shaft, so that sufficient momentum and centrifugal force will be developed to produce a yielding medium which tends to damp or deaden any torsional vibrations that are set up in the crank-shaft.

In the construction shown in Figs. 1 to 4, a cylindrical sleeve 17 fits and is confined in the chamber 13, and is provided with cross-walls to form baffles 18 for the liquid. These baffles divide the body of liquid into portions which will respectively act on the baffles during the reverse impulses of the vibrations of the shaft.

Sleeve 17 is securely and removably held in chamber 13 by the screw-cap 14 against the integral end wall of casing 10. In practice, the chamber is not completely filled with liquid, a filling up to about 94% having been found to be efficient in attaining the desired result. A plug 19 is screw-threaded into the inner side of each casing 10, and sleeve 17 is formed with an opening 20 through which the liquid may be poured into or withdrawn from the chamber 13, so the volume of the liquid in the chamber may be readily and accurately varied to meet the requirements of different motors. A gasket 21 is clamped between the head of plug 19 and a shoulder in the casing, to form a tight seal which will prevent leakage of the liquid from chamber 13.

In the rotation of the crank-shaft, the bodies of liquid 16 under momentum and centrifugal force act as a yielding medium to damp any torsional vibrations which at any time may be set up in the crank-shaft. In the form of the invention under consideration, the volume of the liquid in each casing may be readily and accurately varied for different engines by removing the plug 19. The liquid in each casing is divided to act on the baffles and one end-wall during the reverse impulses of the torsional vibrations.

In Fig. 5, there is illustrated a second form of the invention. In this form the liquid 16ᵃ is contained in a sealed cartridge or shell 17ᵃ. The shell is sealed, as at 17ᵇ, by welding after the liquid has been introduced into it. The screw-cap 14ᵃ in this form of the invention, secures the shell 17ᵃ in the chamber in the casing 10ᵃ, and permits the cartridge to be inserted and replaced with another containing more or less liquid.

In Figs. 6 and 7, there is illustrated a damping device embodying a third form of the invention. This device can be used advantageously in instances where a plurality of bodies of liquid are to be used at each side of the crank. It comprises a pair of casings 23, each having a pair of cylinders 22, adapted to be positioned at opposite sides of a crank. The casings embody integral cross-walls 24 which fit against opposite sides of the crank and are secured in place by bolts 25 which pass through flanges 25ᵃ formed on the crank, so that a pair of cylinders 22 will be disposed at each side of the crank and in balanced relation to each other. The connecting wall 24 of each casing is cut away, as at 26, to clear the pitman on the crank-pin. Each cylinder 22 contains a suitable quantity of liquid and has an integral end wall 22ᵃ and a screw-plug 27 which encloses the other end of the cylinder. A diagonal port 28 is formed in one end of each cylinder, and is closed by a screw-plug 29. Liquid may be poured into the cylinders 22 and removed therefrom through these ports when the plugs are removed. This form of the invention exemplifies one which provides for a plurality of chambers containing liquid at opposite sides of the crank shaft.

The invention exemplifies means for damping torsional vibrations in the crank shafts of high speed reciprocating engines, in which a body of liquid is caused to rotate with the shaft and around its axis to act as a yielding medium to resist or damp the torsional vibrations, thus dispensing with a supplemental fly-wheel having frictional or yielding connection with the crank-shaft. It also exemplifies a device in which provision is made for varying the volume or weight of the liquid to meet the requirements of different engines. It also exemplifies a damping device which is simple in construction, efficient in operation, and can be produced at a low cost.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. The combination with the crank-shaft of a high speed multi-cylinder engine, of a damping device comprising a casing rotatable with the shaft and having a chamber therein, and a removable liquid-filled container in the chamber.

2. The combination with the crank-shaft of a high speed multi-cylinder engine, of a pair of damping devices mounted in balanced relation on, and secured to, opposite sides of a crank on the shaft, each of said devices having a chamber containing liquid.

3. The combination with the crank-shaft of a high speed multi-cylinder engine, of a pair of damping devices mounted in balanced relation on and to rotate with the shaft, each of said devices comprising a casing secured to one side of a crank on the shaft and provided with a chamber therein, and a removable liquid-filled container in the chamber.

4. In combination, a crank-shaft for a high speed multi-cylinder engine, and vibration damping means mounted to rotate with the shaft and embodying a pair of cylindrical liquid-containing chambers arranged in parallel relation and at opposite sides of said shaft.

5. In combination, a crank-shaft for a high speed multi-cylinder engine, and vibration damping means rotatable with the shaft and comprising a pair of separate cylinders having closed sides and ends, said cylinders being positioned in balanced relation and at opposite sides of one of the cranks of the shaft and containing liquid.

6. In combination, a crank-shaft for a high speed multi-cylinder engine, and a vibration damping device comprising a hollow cylindrical casing rotatable with the shaft and a separately formed container with liquid therein held removably in the cylinder and provided with a baffle for dividing the liquid into portions and causing it to rotate positively with the shaft.

Signed at Indianapolis, Indiana, this 22 day of January, 1929.

FREDERICK S. DUESENBERG.